March 30, 1965     R. C. DU BOIS     3,175,531
EXTERNAL POINTER ADJUSTMENT FOR A DIAL INSTRUMENT
Filed Nov. 1, 1963
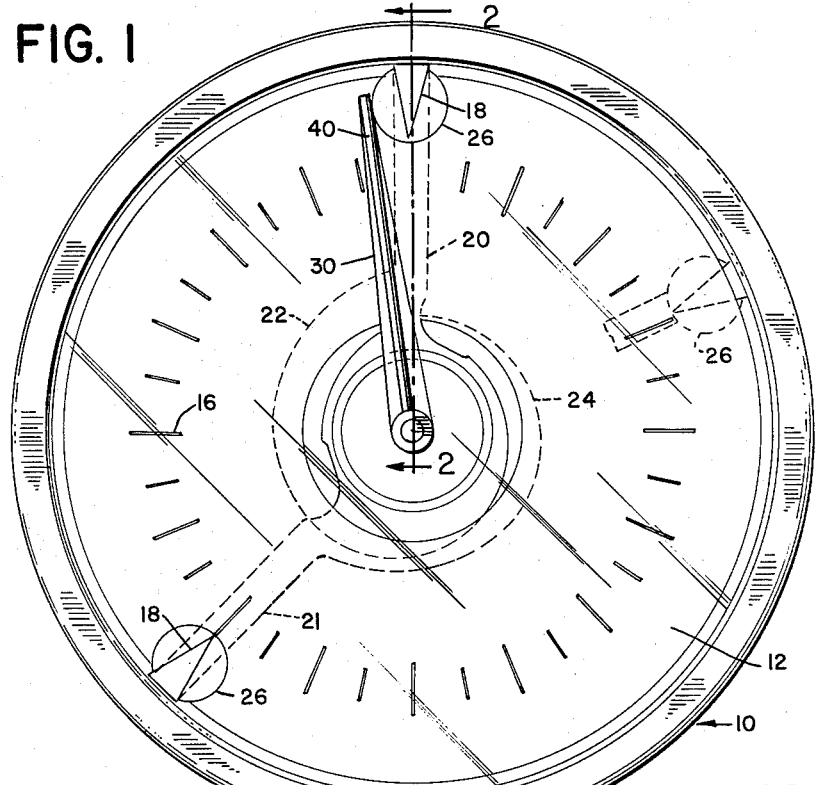
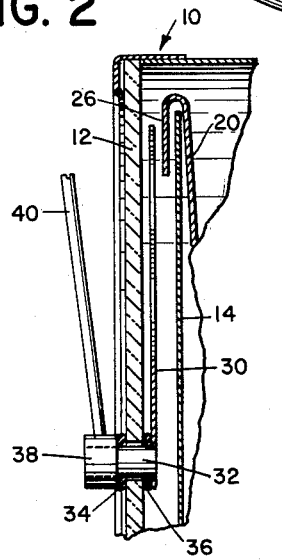
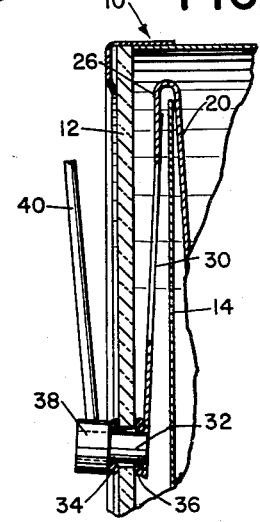
INVENTOR.
ROBERT C. DUBOIS
BY *M W Goodwin*
ATTORNEY

United States Patent Office 3,175,531
Patented Mar. 30, 1965

3,175,531
EXTERNAL POINTER ADJUSTMENT FOR A DIAL INSTRUMENT
Robert C. Du Bois, Fairfield, Conn., assignor to Manning, Maxwell & Moore, Incorporated, Stratford, Conn., a corporation of New Jersey
Filed Nov. 1, 1963, Ser. No. 320,883
7 Claims. (Cl. 116—129)

This invention relates to dial instruments and has as its principal object the provision of novel and improved means for adjusting, from externally of an enclosed instrument casing, the setting of a member within the casing, thereby providing adjustment of the settable member without requiring disassembly of any part of the instrument. The object of the invention is achieved in a preferred embodiment of the invention in a manner which will be apparent from a consideration of the following description when taken in connection with the accompanying drawing in which:

FIG. 1 is a front view of an exemplary dial instrument incorporating the present invention;

FIG. 2 is a fragmentary, cross sectional view substantially along the line 2—2 of FIG. 1; and FIG. 3 is a cross sectional view similar to FIG. 2 showing the elements of the invention in a different position.

With reference to the drawing the present invention is shown in association with a dial instrument of a particular type although it will be understood the invention is not limited to use with this particular type instrument. The dial instrument shown comprises a casing 10 having an open end which is closed by a transparent cover plate 12. Suitably supported within the casing is a dial plate 14 which extends generally parallel to the cover plate 12 in spaced relation thereto. The dial plate carries indicia 16 which cooperate with an index marker or pointer portion 18 on each of a pair of settable members 20 and 21.

In the particular embodiment shown, the settable members 20 and 21 are lever arm extensions of a pair of cams 22 and 24 respectively. The cams are mounted concentrically of each other for rotation about the center of the dial member. The arms 20 and 21 extend generally radially of the axis of the dial and beyond the periphery of the dial plate 14. The dial 14 is spaced inwardly of the cylindrical side wall of the casing 10. The ends of the arms 20 and 21 are redirected radial inwardly and over the dial plate 14 and terminate in a generally circular tip portion 26 on which are provided the index markers 18. It will be observed that adjustment of the ends 26 of the levers 20 and 21 will effect adjustment of the cams 22 and 24 about their axes. The cams cooperate with cam follows (not shown) which are operatively connected to a switch actuating mechanism (not shown) whereby an electric switch will be actuated between its on and off condition in response to a change in a condition (such as temperature or pressure) sensed by the instrument. The portion of the instrument accomplishing this latter function is not shown as is not a part of the present invention.

In order to adjust the high and low settings of the instrument it will be apparent that it is necessary to adjust the settable members or levers 20 and 21 thereby varying the position of the cams 22 and 24. Inasmuch as the operative elements of the instrument are enclosed within the casing 10, it would normally be necessary to remove the cover plate 12, or in some other manner provide access to the settable members in order to permit adjustments thereof. However, in accordance with the present invention these means are provided to accomplish this adjustment of the settable members from externally of the casing without requiring any disassembly thereof. More particularly, the adjustment of the settable member is effected by a setting member or arm 30 which extends radially of the axis of the dial plate and cams and is mounted for movement about said axis. The arm 30 is disposed between the cover plate 12 and dial 14 and is mounted on the inner end of a shaft 32 disposed generally concentrically of and extending through an opening in the cover glass 12. The shaft 32 is disposed generally coaxially of the axis of the dial plate, and, as clearly seen in FIGS. 2 and 3, is radially spaced from the bordering edge portion of the opening of the cover glass through which it extends.

The shaft 32 is supported in spaced relation to the edge portions of the aperture in the cover glass by a pair of toroidal resiliently deformable members 34 and 36 which in the specific embodiment shown are conventional O-rings of rubber-like material. The O-rings are disposed on opposite sides of the cover glass 12 and firmly embrace the shaft 32. Mounted on the outer end of the shaft 32 is a collar 38. Extending from the collar at an angle to the axis thereof is an operating lever 40. The lever 40 is fixed to the collar 38 which in turn is press fit over the shaft 32. As clearly shown in FIGS. 2 and 3 the collar 38 and adjusting arm 30 are provided with oppositely facing surfaces on opposite sides of the cover glass, which surfaces form flanges or shoulders clampingly engaging the O-rings 34 and 36 with the cover glass to provide frictional resistance to turning of the shaft 32. However, it will be understood that by moving the operating lever 40 about the axis of the shaft 32, the shaft 32 may be turned relative to the dial plate; also as will be seen in FIG. 3 the resilient deformability of the O-rings is sufficient to permit the shaft 32 to be inclined relative to the axis of the dial plate in order to permit a universal pivoting of the shaft.

The actuating arm 30 is shown in FIG. 2 in its normal position where in the arm disposed between the cover glass 12 and, for example, the end 26 of the settable member 20 in spaced relation to both. It will be observed that the arm 30 extends radially of the shaft 32 a distance sufficient that it will overlie the end 26 of the member 20. When it is desired to move the member 20 from the full line position shown in FIG. 1 to the dotted line position, the operating arm 40 is manually moved about the axis of the shaft 32 until the actuating arm 30 is in registry with the left edge (as viewed on FIG. 1) of the end 26 of the settable member 20. The outer end of the operating arm 40 is then depressed toward the cover glass to tilt the shaft 32 and thus the actuating arm 30 until the outer free end portion of the actuating arm 30 is generally in the same plane as the end of the settable member. As shown in FIG. 3, the actuating arm 30 will then be engageable with the end of the settable member and the arm 40 may be rotated in a clockwise direction to rotate the settable member in the same direction to the dotted line position shown in FIG. 1. If it is then desired to move the member 20 in a counter-clockwise direction the actuating lever 30 is rotated along a path either between the end 26 and the settable member and the cover plate 12 or between the end of the settable member and dial plate 14 so as to reach the other side of the end of the settable member or movement of the same in a counter-clockwise direction. In this connection it will be observed that the spacing between the end 26 of the settable member and the dial plate as well as the spacing between the settable member and the cover plate is substantially greater than the thickness of the actuating member 30 and is sufficient to permit passage of the actuating member either under or above the end of the settable member. It will also be apparent that adjustment of the settable member 21 is accomplished in the same manner as in the case of the settable member 20.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. In a dial instrument and the like having a dial and a settable member mounted for movement over the dial; means for selectively adjusting the position of said settable member relative to the dial comprising a lever arm having a portion engageable with said settable member, and means mounting said arm for movement in the direction of movement of said settable member and for tilting movement toward and away from the general plane of movement of said settable member, said portion of said arm normally being spaced out of engagement with said settable member.

2. In a dial instrument and the like having a dial and a settable member mounted for movement over the dial; said settable member being in generally parallel spaced relation to the dial; means for selectively adjusting said settable member comprising a lever arm having a portion engageable with said settable member, means mounting said arm for movement in the direction of movement of said settable member and for tilting movement toward and away from the general plane of movement of said settable member, said portion of said arm normally being spaced out of engagement with said settable member and being of a thickness sufficiently less than the spacing of said settable member from said dial to permit passage of said portion of the arm between said settable member and dial.

3. In a dial instrument and the like having a casing supporting a dial member and a transparent cover for closing a portion of the casing and overlying said dial member; a settable member mounted for movement within the casing and over said dial member, means supported on said cover for selectively adjusting said settable member comprising a lever arm having a portion engageable with said settable member, means mounting said arm on the cover for movement in the direction of movement of said settable member and for tilting movement toward and away from the general plane of movement of said settable member, said portion of said arm normally being spaced out of engagement wtih said settable member, and manually movable means externally of said casing and operatively connected to said lever arm for movement of the same.

4. In a dial instrument and the like including a casing enclosing a dial member; a settable member mounted for angular movement about the axis of said dial member, means for selectively adjusting said settable member comprising a lever arm having a portion engageable with said settable member, means mounting said arm for rotation about the axis of said dial member and for tilting movement toward and away from the general plane of movement of said settable member, said portion of said arm being spaced from said axis and normally being spaced out of engagement with said settable member, and manually movable means for rotating and tilting said arm.

5. In a dial instrument and the like having a casing enclosing a dial and having a transparent cover closing a portion of the casing and overlying the dial; a settable member mounted for movement over the dial and about the axis of the same, means for selectively adjusting the settable member comprising a rotatable lever arm having a portion engageable with said settable member, said settable member being spaced from said dial and cover plate a distance greater than the thickness of said portion of said lever arm, means mounting said lever arm for tilting movement toward and away from the general plane of movement of said settable member said portion of the lever arm normally being spaced between the general planes of said settable member and one of said dial and cover members, and means externally of said casing drivingly connected to said lever arm for moving the same about the dial axis and for tilting the arm.

6. In a dial instrument, a casing containing a dial plate with its periphery spaced from the sidewall of the casing, a transparent cover plate overlying the dial plate in spaced relation, a settable member mounted for movement about the axis of the dial plate and having a portion thereof extending radially inwardly from the periphery of the dial plate in overlying spaced relation and terminating short of the center of the dial plate, means for adjusting said settable member about the axis of the dial plate comprising an arm engageable with opposite sides of said settable member, means mounting said arm on said cover plate including a shaft extending through an opening located centrally of said cover plate and in spaced relation to the bordering edge portion of said opening, means providing a pair of shoulders on opposite sides of said cover plate moveable with said shaft and facing said cover plate, a pair of annular resilient members embracing said shaft on opposite sides of said cover plate and clamped between said shoulders and said cover plate and supporting said shaft in spaced relation with the bordering edge portion of said aperture while permitting frictionally resisted rotation of said shaft and universal inclination of the shaft relative to the axis of said opening, and a lever arm externally of said cover and fixed to said shaft for movement of the first arm about the axis of said dial plate and for inclining the shaft relative to the axis of said opening, said first arm extending generally radially of said shaft a distance sufficient to be in an overlying relation with said settable member, the portion of said first arm engageable with said settable member being of a thickness less than the spacing of said settable member from said dial and cover plates so that it may be passed between said settable member and said dial and cover plates.

7. In a dial instrument and the like having a casing enclosing a dial and having a transparent cover closing a portion of the casing and overying the dial; a settable member mounted for movement over the dial about the axis of the same, means for selectively adjusting the settable member comprising a rotatable lever arm having a portion engageable with said settable member, said settable member being spaced from said dial and cover plate a distance greater than the thickness of said portion of said lever arm, means mounting said lever arm for rotation about the axis of said dial member and for tilting movement toward and away from the general plane of movement of said settable member including a shaft mounted for movement with the lever arm and extending through an aperture in said cover member, means providing a pair of oppositely facing shoulders movable with said shaft and disposed on opposite sides of said cover member in spaced relation thereto, and a pair of annular resiliently deformable members clamped between said shoulders and said cover member, the diameter of said shaft being substantially less than the diameter of the aperture in said cover member whereby said shaft may be tilted thereby to tilt the axis of said shaft relative to said cover member, said portion of said lever arm normally being spaced between the general planes of said settable member and one of said dial and cover members, and means externally of said casing drivingly connected to said lever arm for moving the same about the dial axis and for tilting the arm.

References Cited by the Examiner
UNITED STATES PATENTS 1,824,781   9/31   La Bar ---------------- 324—103

LOUIS J. CAPOZI, *Primary Examiner.*